(12) United States Patent
Sheehan et al.

(10) Patent No.: US 9,304,791 B2
(45) Date of Patent: Apr. 5, 2016

(54) STATE SEPARATION FOR VIRTUAL APPLICATIONS

(71) Applicant: Microsoft Technology Licensing, LLC, Redmond, WA (US)

(72) Inventors: John M Sheehan, Somerville, MA (US); Kristofer H Reierson, Acton, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/644,773

(22) Filed: Mar. 11, 2015

(65) Prior Publication Data

US 2015/0186164 A1 Jul. 2, 2015

Related U.S. Application Data

(63) Continuation of application No. 13/907,974, filed on Jun. 3, 2013, now Pat. No. 8,984,512, which is a continuation of application No. 13/208,484, filed on Aug. 12, 2011, now Pat. No. 8,458,701, which is a continuation of application No. 12/181,315, filed on Jul. 28, 2008, now Pat. No. 8,024,732.

(51) Int. Cl.

| G06F 9/00 | (2006.01) |
|---|---|
| G06F 9/46 | (2006.01) |
| G06F 9/455 | (2006.01) |
| G06F 9/445 | (2006.01) |

(52) U.S. Cl.
CPC ............ *G06F 9/455* (2013.01); *G06F 9/44505* (2013.01)

(58) Field of Classification Search
CPC .............................. G06F 9/455; G06F 9/44505
See application file for complete search history.

(56) References Cited

U.S. PATENT DOCUMENTS

| 5,212,789 A | 5/1993 | Rago |
| 5,832,283 A | 11/1998 | Chou et al. |
| 6,131,134 A * | 10/2000 | Huang ................ G06F 13/4081 710/302 |

(Continued)

FOREIGN PATENT DOCUMENTS

| EP | 1562113 A1 | 8/2005 |
| EP | 1686465 A2 | 8/2006 |

(Continued)

OTHER PUBLICATIONS

"The benefits of application virtualization", Published on: Apr. 2008, Available at: http://searchsystemschannel.techtarget.com/feature/The-benefits-of-application-virtualization.

(Continued)

*Primary Examiner* — Mark Connolly
(74) *Attorney, Agent, or Firm* — Henry Gabryjelski; Kate Drakos; Micky Minhas (57) ABSTRACT

The present invention relates to dispositioning state changes for applications. An application can be executed with different behaviors depending on the resources available to the application. The application can be executed with one behavior based on the availability of a specified resource and can be executed with another different behavior when a change in availability of the specified resource is detected. A configuration can be applied to an application based on a fist defined state for the application. Applying the configuration causes the application to execute with a first behavior. A change in available resources defines a second state for the application. The change in available resources is dispositioned (e.g., stored or discarded) in accordance with a policy based on a determine context for the second state.

36 Claims, 2 Drawing Sheets

(56) References Cited

U.S. PATENT DOCUMENTS

| | | | |
|---|---|---|---|
| 7,243,267 | B2 | 7/2007 | Klemm et al. |
| 7,434,218 | B2 | 10/2008 | Fries |
| 8,024,732 | B2 | 9/2011 | Sheehan et al. |
| 8,458,701 | B2 | 6/2013 | Sheehan et al. |
| 2002/0021278 | A1 | 2/2002 | Hinckley et al. |
| 2002/0087734 | A1* | 7/2002 | Marshall ............... G06F 9/50 719/310 |
| 2004/0153973 | A1 | 8/2004 | Horwitz |
| 2005/0125688 | A1 | 6/2005 | Ogawa et al. |
| 2005/0262173 | A1 | 11/2005 | Choquier et al. |
| 2006/0036570 | A1 | 2/2006 | Schaefer et al. |
| 2006/0070085 | A1 | 3/2006 | Bao et al. |
| 2006/0212878 | A1 | 9/2006 | Park et al. |
| 2007/0033382 | A1 | 2/2007 | Mandalia et al. |
| 2007/0162785 | A1 | 7/2007 | Downer et al. |
| 2007/0192709 | A1 | 8/2007 | Popp et al. |
| 2007/0261048 | A1 | 11/2007 | Bernabeu-Auban et al. |
| 2009/0204966 | A1 | 8/2009 | Johnson et al. |
| 2010/0257535 | A1 | 10/2010 | Badovinatz et al. |

FOREIGN PATENT DOCUMENTS

| | | |
|---|---|---|
| JP | 63104144 A | 5/1988 |
| JP | H02173828 A | 7/1990 |
| JP | 2006209774 A | 8/2006 |
| JP | 2008509475 A | 3/2008 |
| WO | 2007020735 A1 | 2/2007 |

OTHER PUBLICATIONS

Al-Bar, et al., "Camel: A Mobile Applications Framework", In Proceedings of the International Conference on Computer Networks and Mobile Computing, Oct. 2003, pp. 214-223.

Keeney, et al., "Chisel: A Policy-Driven, Content-Aware, Dynamic Adaptation Framework", In Proceedings of the 4th International Workshop on Politics for Distributed Systems and Networks, Jun. 4, 2003, pp. 3-14.

Suzuki, et al., "A Context—Aware Operating System for Excluding Untrustworth Applications", In Information Processing Society of Japan SIG Technical Report, vol. 2004, No. 17, Feb. 27, 2004, 1 Page.

Zhong, et al., "State Provisioning with XAP", A Thesis Submitted to the School of Mathematics and Systems Engineering in Partial Fulfillment of the Requirements for the Degree of Master in Computer Science Department, Vaxjo University, Jun. 2006, 57 Pages.

"European Search Report Issued in European Patent Application No. 09803377", Mailed Date: Sep. 26, 2011, 5 Pages.

"Office Action Issued in Korean Patent Application No. 10-2011-7001567", Mailed Date: Jul. 23, 2015, 3 Pages. (W/o English Translation).

"Notice of Allowance Issued in U.S. Appl. No. 12/181,315, Mailed Date: Jun. 3, 2011", 8 Pages.

"Non-Final Office Action Issued in U.S. Appl. No. 13/208,484, Mailed Date: Aug. 8, 2012", 11 Pages.

"Non-Final Office Action Issued in U.S. Appl. No. 13/907,974, Mailed Date: Aug. 20, 2013", 6 Pages.

"Non-Final Office Action Issued in U.S. Appl. No. 13/907,974, Mailed Date: Jun. 27, 2014", 9 Pages.

"Notice of Rejection Issued in Japanese Patent Application No. 2011-521184, Mailed Date: Jul. 2, 2013", 5 Pages.

"Office Action Issued in Australian Patent Application No. 2009276851", Mailed Date: Mar. 13, 2014, 3 Pages.

"Office Action Issued in Japanese Patent Application No. 2011-521184", Mailed Date: Jan. 31, 2014, 6 Pages.

"Office Action Issued in Canada Patent Application No. 2,728,817", Mailed Date: Sep. 1, 2015, 3 Pages.

* cited by examiner

STATE SEPARATION FOR VIRTUAL APPLICATIONS

CROSS REFERENCE TO RELATED APPLICATIONS

This application claims the benefit of and priority to U.S. Patent application Ser. No. 13/907,974, entitled "State Separation For Applications", filed Jun. 3, 2013 by John M. Sheehan et al., the entire contents of which are expressly incorporated by reference. That application claims the benefit of and priority to U.S. patent application Ser. No. 13/208,484, now U.S. Pat. No. 8,458,701, entitled "State Separation For Virtual Applications", filed Aug. 12, 2011 by John M. Sheehan et al., the entire contents of which are expressly incorporated by reference. That application claims the benefit of and priority to U.S. patent application Ser. No. 12/181,315, now U.S. Pat. No. 8,024,732, entitled "State Separation for Application Changes", filed Jul. 28, 2008 by John M. Sheehan et al., the entire contents of which are expressly incorporated by reference.

BACKGROUND

Applications can be modified in many different manners. In some cases, an application may be modified by updating registries, changing configuration files, updating dynamic linked libraries, or other mechanisms. Each change to the application may affect portions of an operating system, which may in turn affect other applications

SUMMARY

The present invention extends to methods, systems, and computer program products for dispositioning state changes for applications. In some aspects, an application is executed at a device. The application is configured to integrate with a plurality of resources, including integrating with a specified resource when the specified resource is available to the application. The application has a first state defined by a current availability of the specified resource and exhibits first behavior based on the first state.

A change to the availability of the specified resource is detected. The change to the availability of the specified resource defines a second state for the application. A second different behavior is determined for the application based on the second state. The application is executed to exhibit the second different behavior in response to the detected change in availability of the specified resource.

In other aspects, an application configuration is accessed based on a defined first state for an application. The application configuration is accessed from among a plurality of configurations stored in a computer hardware memory device. The accessed application configuration is applied to an application to execute the application with a specified behavior based on the defined first state. A change in hardware resources available to the executing application at the device is detected subsequent to applying the configuration. The change defines a second state for the application based on the change to the available hardware resources. A context is determined for the second state. The detected change is dispositioned in available hardware resources based on the context as defined in a policy for the context.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Applications may be operated in different states or configurations. One such mechanism is through application virtualization. When an application is configured for a particular context, the configuration information may be saved and recalled for later use. The application may be configured to operate in many different states and a set of policies manage the configurations.

The state in which an application is executed may include operating system configurations, the presence and operation of various other applications, the configuration of services accessed over a network or other connection, and many other factors. The configuration and operation of the application may be different for different states.

For example, some applications may have a symbiotic relationship with other applications. The behavior or performance of an application on its own may be different from the behavior or performance of an application with another integral application. In such an example, a configuration may be defined for the application in the state of solo operation, and a separate configuration may be defined for the application when the second symbiotic application is present and operating.

In a typical embodiment, applications may be operated in a virtual environment. The virtual environment may be capable of accepting different sets of configuration settings based on a particular context. In some cases, a virtual environment may be a virtual machine environment. In other cases, a virtual environment may be a virtual application environment.

For the purposes of this specification and claims, an application configuration may refer to the way an application is set up or configured. An application configuration may include any element that may be changed or set, including those elements that affect the performance, functions, look, or other operational characteristics of the application.

For the purposes of this specification and claims, an application state may refer to the context in which an application is executed. The state may include an operating system and any settings or configurations of the operation system or any applications installed or executing. The state may include the condition and configuration of any other element that may interact with the application, including hardware components, services available over a network, other executing applications, peripheral devices, and any other item.

For the purposes of this specification and claims, an application context may be a category of an application state. While the state may include any variable that may affect an application, a context may be a broad category that may be used to classify and store a configuration. For example, contexts may be defined for sessions, virtual application environments, virtual machine environments, user specific contexts, machine specific contexts, user group or machine group specific contexts, contexts where two or more interacting applications interoperate, and other contexts.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

Figure 1:
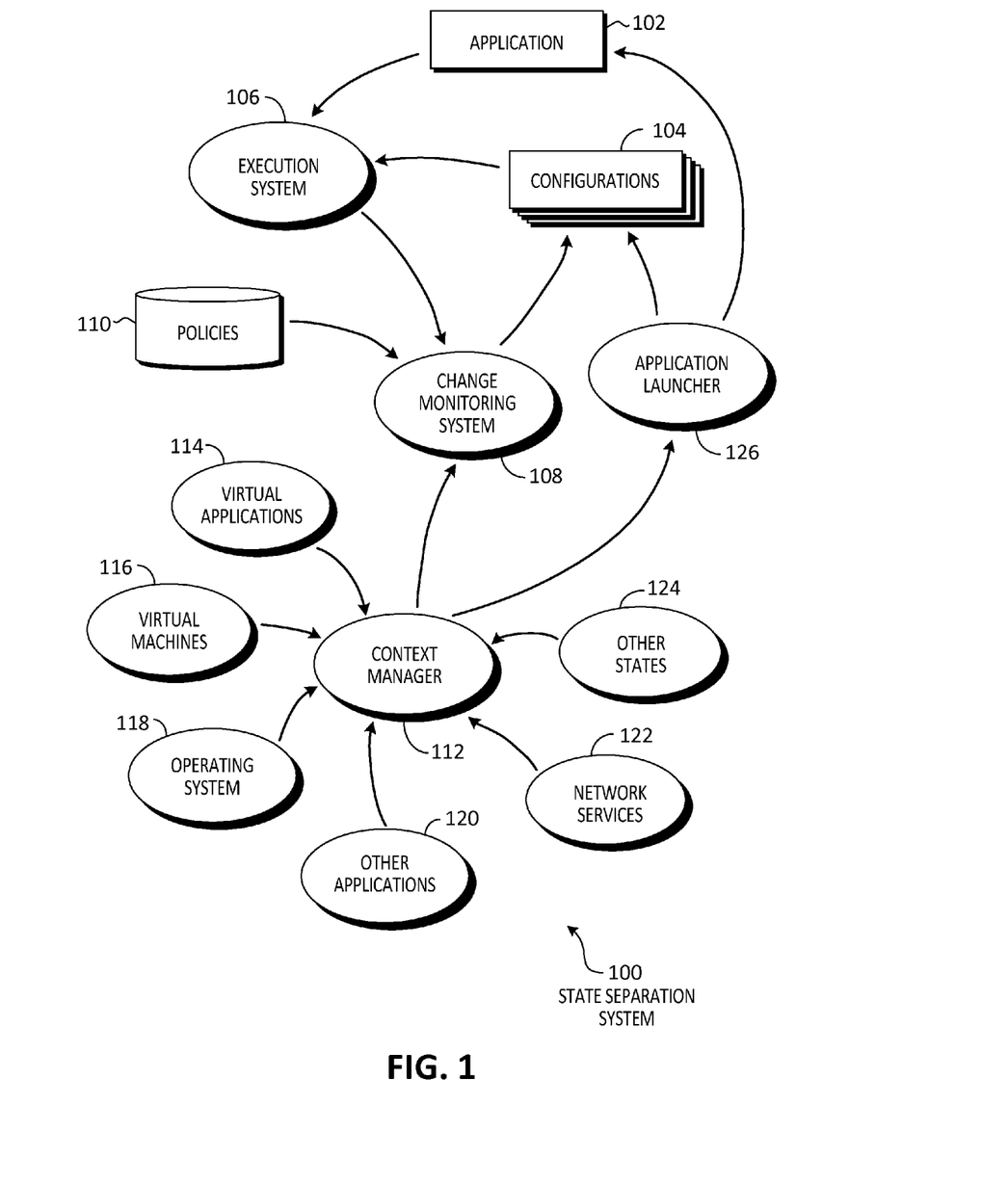
FIG. 1 is a diagram illustration of an embodiment showing a system for storing different configurations based on the context of an application.

FIG. 1 is a diagram of an embodiment 100 showing a system with a state separation and management system. Embodiment 100 is an example of a system that may store and manage configurations for an application based on the context or state of the application.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 100 is an example of the functional elements that may make up a multi-state execution system for an application. Different configurations 104 of the application 102 may be executed in an execution system 106 based on the context in which the application is to be executed.

Various embodiments may have different levels of configurations that may be executed for an application. For example, an application that is installed and executed within an operating system environment may have a set of configuration files that define a configuration. A different set of configuration files may be used to launch the application 102 based on the context associated with the configuration files.

In another example, an application may be executed within a virtual environment and, in addition to the configuration files of the previous example, registry settings, dynamic linked libraries, and many other configuration elements may be varied between contexts. Such virtual environments may be virtual machine environments or virtual application environments. When a virtual environment is used to execute an application, a very broad and rich set of configuration elements may be varied between contexts.

An application 102 may be any type of executable program or set of programs, services, or other operations that are performed within a computing environment. In many cases, an application may have a collection of executable elements such as files that may be executed directly within an operating system environment or executed within an application environment, such as scripts, subroutines, libraries, or other components.

Many applications 102 may operate in conjunction with other applications or services. For example, an application 102 may operate with a web service that is accessed over the Internet. In such an example, the application may perform some operations and the web service may perform other operations in order to deliver a user experience.

In another example, an application 102 may be operable on its own or with another application that 'plugs in' or is at least partially integrated with the first application. An example may be an application such as a word processing program that may display a toolbar, menu items, or other links to a document publishing application when the document publishing application is operational. When the document publishing application is not available, the word processing application may have one user interface, but may have a second user interface and second set of functions available when the document publishing application is available.

In such an example, the application 102 may have one configuration 104 defined for a state or context when operating alone, and a second configuration 104 defined for a second state or context when operating with a second application. Each configuration 104 may be separately defined and managed using a change monitoring system 108 in conjunction with a set of policies 110.

The change monitoring system 108 may detect and store changes to an application configuration 104. The change monitoring system 108 may detect a change, classify the change, and determine if the change is applicable to one or more contexts in which the application 102 is executing or will be executed. The definitions of how the changes and contexts are classified and how the changes are dispositioned may be defined in the policies 110.

Embodiment 100 shows a separate application 102 and a set of configurations 104. In some embodiments, the configurations 104 may be stored as a set of files or settings that may be implemented on top of default configurations that may be defined within the application 102. In such embodiments, the configurations 104 may be viewed as a 'delta' file or group of changes from the default.

In other embodiments, an application may be defined as a package that includes one of the configurations 104. A different application package may be created for each configuration. Such embodiments may be used where the settings within a configuration are pervasive or where the configuration changes are used when the application is started. An example of such configuration changes may be registry settings that define options used by the application during initial startup.

The execution system 106 may be any environment, workspace, or mechanism capable of executing the application 102. In some embodiments, the execution system 106 may be an operating system environment in which many other applications and services operate, including the change monitoring system 108, for example. In some embodiments, the execution system 106 may be a virtual environment such as a virtual machine or a virtual application environment. In still other embodiments, the execution system 106 may be a separate hardware platform that executes the application 102.

The architecture of the embodiment 100 may be any type of computing architecture. In some embodiments, many of the components illustrated in embodiment 100 may be executed on a single hardware platform such as a personal computer or server computer. In other embodiments, some of the components may be performed on one hardware platform while other components may be performed on a separate hardware platform. Some such embodiments may use many different hardware platforms to implement the embodiment 100. Such embodiments may be termed a cross machine configuration.

In some cross machine architectures, some of the components of embodiment 100 may be implemented as virtual machines or operated within virtual application environments. A virtual machine may be a software simulation of a hardware platform and may contain an operating system and may function as if the virtual machine were a separate, dedicated hardware platform.

Application virtualization may create application-specific copies of all shared resources. Each application may have a separate configuration of potentially shared resources such as registry entries, dynamic linked libraries, and other objects that may be packaged with the application. The package may be executed in a cache, creating a virtual application. When a virtual application is deployed, it may use its own copy of these shared resources.

A context manager 112 may determine a context in which an application is operating or will be operating. The context manager 112 may monitor the presence, configuration, and other parameters of many different resources that may be available for the application 102. The context manager 112 may determine a state for an application that may be used by the change monitoring system 108 to store configurations appropriately. The context manager 112 may also define a state for an application launcher 126 which may select between the various configurations 104 based on the state or context.

The context manager 112 may be an application or service that continually monitors various facets of a system. In some cases, such a context manager 112 may operate on a single hardware platform and monitor various conditions. The hardware platform may be the same hardware platform on which the application 102 may be executed. In other embodiments, the context manager 112 may be a service that operates remotely from the hardware platform on which the application 102 is executed.

The context manager 112 may collect various information, metadata, and parameters about the state in which an application is being operated or will be operated. The context manager 112 may collect any pertinent information that may be used within the policies 110 to handle configurations in different manners. Different embodiments may collect different sets of information and metadata to determine a current state.

Examples of contextual metadata may include what virtual applications 114 are present or not present, the presence of various virtual machines 116, the presence and configuration of an operating system 118, the presence and configuration of various other applications 120 and network services 122, as well as other state information 124. Other state information may be a session in which an application is operated, membership in a group of users or devices, or other parameters.

The other state information 124 may include information about a session, which may include metadata about a session. For example, the state information 124 may include the type of session, which may be a session connecting two or more specific devices or users, or a session connecting two or more general devices or users. The session metadata may also include various connection parameters, such as the protocols used within a session or the addresses or ports used to establish a session. In some embodiments, an application may create several different types of sessions with other applications or services, and the presence, absence, or configuration of the sessions may be defined as part of the context for the application.

The presence and configuration of other interactive components may define a part of the context for an application. The application 102 may interact with virtual applications 114, virtual machines 116, applications 120, and network services 122 in different capacities. In some cases, the performance or operation of an application may be affected by the presence, absence, or configuration of various interactive components external to the application 102.

The presence, absence, and in some cases the configuration of a component with which an application interacts may define a new state for an application. For example, an application may add or remove user interface components for other applications or services. When another application is present and configured, a first application may provide a certain set of user interface components or functionality that link to or use functionality provided by the other application. When the other application is not present or configured differently, the first application may present an alternative user interface or functionality.

A component with which the application interacts can be a virtual component. In some cases, an application may be executed virtually using the execution system 106 while another application may also be executed virtually. Because both applications are executed virtually, each application may operate without interacting with each other in a default configuration. However, when both applications are operational, each application may be configured to pass data, control, or other signals between each application. In such a case, each application may have a designated configuration 104 that defines the interaction points and enables the interaction to occur, even when both applications are operated virtually and separately. In such a case, both applications may be launched simultaneously or sequentially with the proper configurations so that the applications may interact.

The virtual components may present different configuration options than components that are installed and operating within the same operating system as the application 102. In general, virtual components may operate agnostically to other components and may be configured in particular manners to interact with other applications in separate environments, including conventional operating system environments or other virtual environments.

A context may include various parameters or configurations of an operating system 118. For example, a context may include general information about an operating system, such as the type of operating system, the specific version, and other parameters about the native operating system. A context may also include additions or changes to the operating system environment, such as registry settings, the presence and configuration of files such as dynamic linked libraries, settings used by the operating system to access various hardware peripheral devices and interfaces, and any other type of parameter.

In some embodiments, the configurations 104 may be applied when an application is launched. Some embodiments may also enable a configuration 104 to be applied to an application 102 after the application begins execution.

Some embodiments may enable some configurations 104 may be able to be applied after beginning execution while other configurations 104 may only be applied when an application starts. In such embodiments, two or more configurations 104 may be applied to a single instance of an application 102. For example, a company-wide configuration may be defined that sets company-wide default settings for an application. A second configuration may be applied that contains user-specific settings that may or may not further adjust the company-wide configuration for a user's personal preferences.

In another example, an application 102 may interact with several other applications or network services. Each network service or application may be defined within a separate configuration 104 so that when the application 102 is started, many different configurations 104 may be applied, each enabling a separate application or service to be accessed.

An application 102 may also interact with various network services 122 that may be available over a local area network (LAN), wide area network (WAN), or any other network, including the Internet. In many cases, a web service may be used to provide data in response to queries and other operations or services. A configuration 104 may be defined for executing the application 102 when the web service or other network service 122 is present. Such a configuration may include various parameters such as ports, protocols, addresses, and other communication configuration information, as well as configuring specific functionality to be available through the application 102.

The configuration 104 may include user interface components, links, or other configurable items that may enable a network service 122 to be accessed in certain instances.

For example, a word processing program may use a thesaurus service that is provided as a network service 122. When the thesaurus service is available, the word processing program may have links to the thesaurus service in the user interface, such as a menu selection for accessing the thesaurus service. When the thesaurus service is selected, a query may be sent to the network service and a response received. The response may be displayed within the word processing program as if the thesaurus service were part of the word processing program. In such a case, a user may not realize that a network service was invoked. When the thesaurus service is not available, the configuration 104 may substitute a local version or may make a thesaurus function inactive, invisible, or otherwise inaccessible.

The context manager 112 may define a context within which an application is currently operating or intended to be operated. The context may be used in conjunction with the policies 110 to create a specific configuration 104 that may be recalled when an application launcher 126 starts the application 102. The context manager 112 may also detect a current context that may be used by the application launcher 126 to select the appropriate configuration 104 or group of configurations 104.

The context in which an application executes may be defined by the policies 110. A context may be a classification or type of state. In many cases, a state may have several contexts. For example, an application 102 may interact with another application operating on a virtual machine 116 as well as interact with a network service 122. The presence of a virtual machine 116 may define a virtual machine context and the presence of network services may define a network enabled context. In some cases, two or more different contexts may apply.

When multiple configurations 104 may be applied to a single instance of an application 102, multiple independent contexts may be defined for a specific instance. In the example above, a virtual machine context and a network enabled context may be defined separately and independently.

When a single configuration 104 may be applied to an instance of an application 102, a context may be defined that is the conjunction of several different factors. In the example above, a single context may be defined that includes a virtual machine and network enabled services and a single configuration 104 may be created. Separate configurations may be created for a virtual machine without the network enabled services and for network enabled services without the virtual machine.

The policies 110 may define the type of context and how changes to an application configuration are to be handled based on the context. For example, some changes may be discarded while other types of changes may be stored. When multiple independent configurations are used, a policy may define one type of change to be stored in one context but not another.

Figure 2:
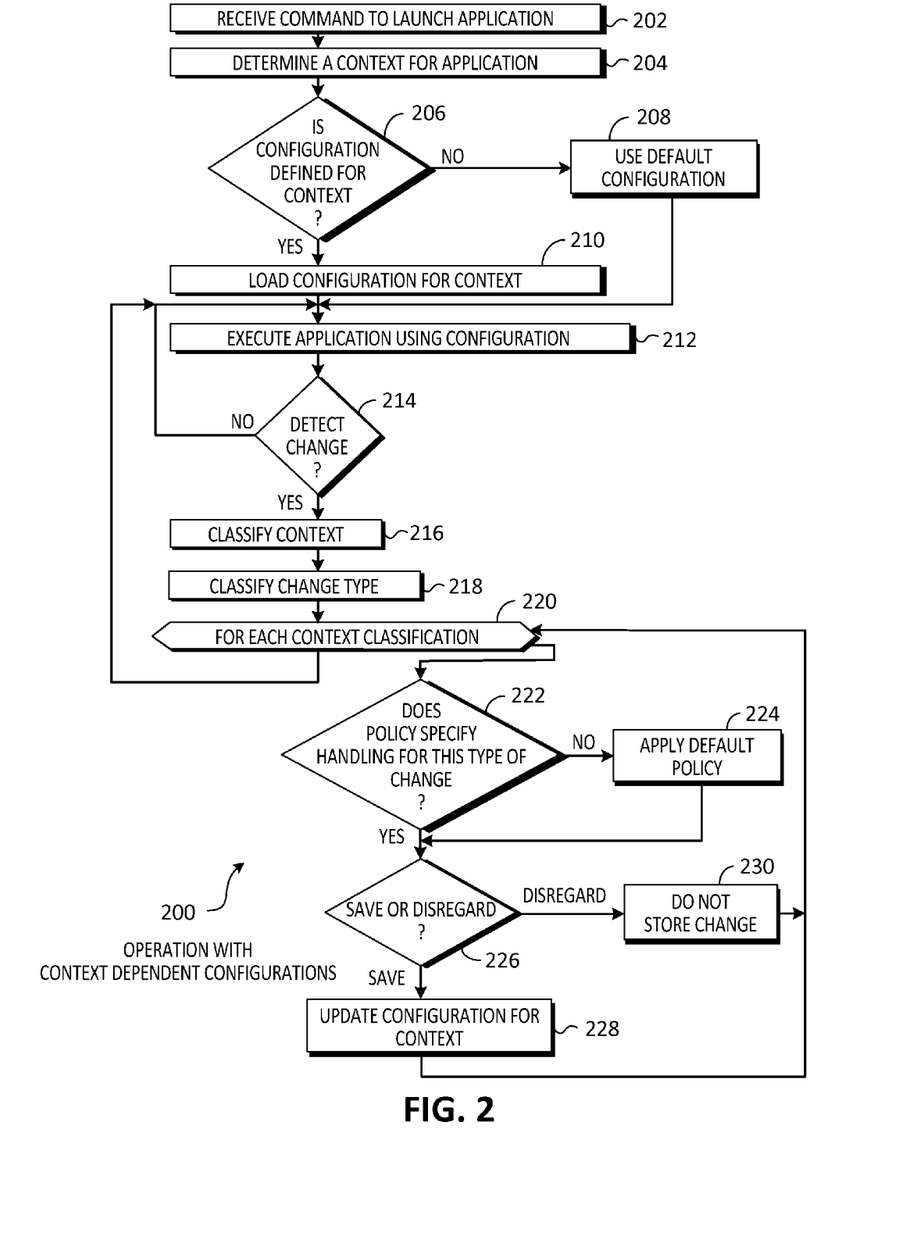
FIG. 2 is a flowchart illustration of an embodiment showing a method for operating with different context configurations.

FIG. 2 is a flowchart illustration of an embodiment 200 showing a method for operating with context dependent configurations. Embodiment 200 is an example of various operations that may be performed by the components of embodiment 100, including an application launcher 126, a context manager 112, a change monitoring system 108, and an execution system 106.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 200 illustrates a method for launching an application, detecting changes to the configuration of the application, and storing the changes in a configuration store for later reuse.

A command may be received to launch an application in block 202. In many cases, a command may be initiated by a user input such as selecting an icon or entering a command on a command line. In other cases, a command to launch an application may be initiated by another application or service, including a network service.

The context for the application may be determined in block 204. The context may be defined in a policy and sets of configuration parameters for the application may be created for specific contexts. The context may be determined by any manner. In some embodiments, a context manager such as context manager 112 in embodiment 100 may be used to determine the current or intended context.

The context may be a current context or an intended context. A current context may be determined by sensing the current state of various parameters, systems, and services with which an application may interact. An intended context may be a context that may exist when the application is executing.

An intended context may be used when several applications that may interact with each other are launched in succession or substantially simultaneously. Each application in the group of launched applications may be configured to operate with the other applications, but such a context may exist when all of the applications have been started and have made connections with each other.

If there is no configuration defined for the context in block 206, a default configuration may be selected in block 208. If a configuration is defined for the context in block 206, the configuration may be loaded in block 210.

In some embodiments, two or more configurations may be loaded and applied based on the context. In such embodiments, various configurations may be applied in succession, with the last configuration applied being able to overwrite a setting of a previous configuration.

Some embodiments may apply a priority scheme to determine which parameters of which configuration may be applied when more than one configuration sets a parameter. In a succession priority scheme, the last configuration applied may dominate. However, in other schemes different metrics or rules may be applied. Such rules may be defined in a set of policies.

Once the configurations are defined, the application may be executed using the configurations in block 212.

In many embodiments where multiple configurations are used, the application may be executed in a virtual environment, such as a dedicated virtual machine or within an application virtualization environment. By virtualizing an application, many settings may be changed or configured in an easier manner than if the application were operating within a conventional operating system environment with many other applications. For example, a virtual environment may enable registry settings or dynamic linked libraries that may otherwise be shared with another application to be changed for the virtual application.

If a change is detected in block 214, a process may begin for creating or modifying a configuration setting based on the context of the application.

The context may be classified in block 216. In some embodiments, a specific instance may include several different contexts, each having one or a small number of parameters that may be independent from other contexts. In other embodiments, a single context may be defined for any situation that may contain many different parameters or descriptors. A set of policies may define the contexts.

The change may be classified by type in block 218. The change type may be a general classification of the change as defined in a policy so that the change may be dispositioned appropriately.

For each context classification in block 220, the change may be dispositioned in the following blocks. Embodiment 200 is an example of an embodiment where two or more contexts may exist for a particular situation. In other embodiments, a single context may be defined and the for-loop of block 220 may be performed a single time for the context.

If the policy does not specify how the type of change is handled in block 222, a default policy may be applied in block 224. Otherwise, the current policy may be applied.

The current policy or default policy may state whether the change is to be saved or disregarded in block 226. If the change is to be disregarded in block 226, the change may not be stored in block 230. If the change is to be saved in block 226, the configuration may be updated for the context in block 228.

The process may continue in block 220 for the next context, if one exists. When each of the contexts has been processed in block 220, the process may return to block 212 for further execution of the application.

Embodiment 200 is an example of a process that may be used to determine a context and save a change to an application based on the context. When an application is restarted in the same context, the configuration may be recalled and the application may behave in conformance to the change.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A computer system, the system comprising:
one or more processors; and
one or more computer storage devices having stored thereon computer-executable instructions, that when executed by the one or more processors, control the computer system to:
execute an application to exhibit a first behavior, the application configured to integrate with a plurality of resources, including integrating with a specified resource when the specified resource is available to the application, the first behavior based on a first state defined by an availability of the specified resource;

detect a change to the availability of the specified resource, the change to the availability of the specified resource defining a second state for the application;

determine a second different behavior for the application based on the second state; and execute the application to exhibit a second different behavior in response to the detected change in availability of the specified resource.

2. The computer system of claim 1, wherein computer-executable instructions, that when executed by the one or more processors, control the computer system to execute an application to exhibit a first behavior comprise computer-executable instructions, that when executed the one or more processors, control the computer system to execute an application that presents a selectable user interface component for the specified resource at a display device, the selectable used interface component presented based on the first state indicating that the specified resource is available to the application.

3. The computer system of claim 2, wherein computer-executable instructions, that when executed by the one or more processors, controlling the computer system to detect a change to the availability of the specified resource defining a second state comprise computer-executable instructions, that when executed by the one or more processors, control the computer system to, subsequent to presenting the user interface component, detecting that the specified resource is not available to the application.

4. The computer system of claim 3, wherein computer-executable instructions, that when executed by the one or more processors, control the computer system to determine a second different behavior for the application based on the second state comprise computer-executable instructions, that when executed by the one or more processors, control the computer system to determine that the selectable user interface component is to be removed from the display device based on the second state indicating that the specified resource is not available to the application.

5. The computer system of claim 4, wherein computer-executable instructions, that when executed by the one or more processors, control the computer system to determine a second different behavior comprise computer-executable instructions, that when executed by the one or more processors, control the computer system to execute the application to present a further selectable user interface component at the display device to replace the selectable user interface component, the further selectable user interface component for another resource from among the plurality of resources, the other resource providing at least a portion of the functionality of the specified resource.

6. The computer system of claim 1, wherein computer-executable instructions, that when executed by the one or more processors, control the computer system to execute the application to exhibit a first behavior comprise computer-executable instructions, that when executed by the one or more processors, control the computer system to execute an application that presents a selectable user interface component for another resource at a display device based on the first state indicating that the specified resource is not available to the application, the other resource providing at least a portion of the functionality of the specified service.

7. The computer system of claim 6, wherein computer-executable instructions, that when executed by the one or more processors, control the computer system to detect a change in the availability of the specified resource defining a second state comprise computer-executable instructions, that when executed by the one or more processors, control the computer system to, subsequent to presenting the user interface component, detect that the specified resource is available to the application.

8. The computer system of claim 7, wherein computer-executable instructions, that when executed by the one or more processors, control the computer system to determine a second different behavior for the application based on the second state comprise computer-executable instructions, that when executed by the one or more processors, control the computer system to determine that the selectable user interface component is to be removed from the display device based on the second state indicating that the specified resource is available to the application.

9. The computer system of claim 8, wherein computer-executable instructions, that when executed by the one or more processors, control the computer system to determine a second different behavior comprise computer-executable instructions, that when executed by the one or more processors, control the computer system to execute the application to present a further selectable user interface component at the display device to replace the selectable user interface component, the further selectable user interface component for the specified resource.

10. The computer system of claim 1, wherein computer-executable instructions, that when executed by the one or more processors, control the computer system to execute an application to exhibit a first behavior comprise computer-executable instructions, that when executed by the one or more processors, control the computer system to execute at a virtual machine and wherein the specified resource is a virtual resource.

11. The computer system of claim 1, wherein computer-executable instructions, that when executed by the one or more processors, control the computer system to execute an application to exhibit a first behavior based on the availability of a specified resource comprise computer-executable instructions, that when executed by the one or more processors, control the computer system to execute an application to exhibit a first behavior based on the availability of a network service.

12. A computer system, the system comprising:
one or more processors; and
one or more computer storage devices having stored thereon computer-executable instructions, that when executed by the one or more processors, control the computer system to:
access an application configuration based on a defined first state for an application, the application configuration accessed from among a plurality of configurations stored in a computer hardware memory device; and
apply the accessed application configuration to an application to execute the application with a specified behavior based on the defined first state; and
wherein a change monitoring system is configured to:
detect a change in hardware resources available to the executing application at the device subsequent to applying the configuration, the change defining a second state for the application based on the change to the available hardware resources;
determine a context for the second state; and
disposition the detected change in available hardware resources based on the context as defined in a policy for the context.

13. The computer system of claim 12, wherein computer-executable instructions, that when executed by the one or more processors, control the computer system to access an application configuration based on a defined first state for an application comprise computer-executable instructions, that when executed by the one or more processors, control the computer system to access an application configuration to execute the application for solo operation.

14. The computer system of claim 12, wherein computer-executable instructions, that when executed by the one or more processors, control the computer system to access an application configuration based on a defined first state for an application comprise computer-executable instructions, that when executed by the one or more processors, control the computer system to access an application configuration to execute the application in a symbiotic relationship with another software component.

15. The computer system of claim 12, wherein computer-executable instructions, that when executed by the one or more processors, control the computer system to access an application configuration based on a defined first state for an application comprise computer-executable instructions, that when executed by the one or more processors, control the computer system to access the application configuration from among the plurality of configurations based on a priority of the application configuration.

16. The computer system of claim 12, wherein computer-executable instructions, that when executed by the one or more processors, control the computer system to apply the accessed configuration to the application to execute the application with a specified behavior comprise computer-executable instructions, that when executed by the one or more processors, control the computer system to apply the accessed application configuration to cause the application to exhibit specified user interface behavior on a display device.

17. The computer system of claim 12, wherein computer-executable instructions, that when executed by the one or more processors, control the computer system to apply the accessed application configuration to the application to execute the application comprise computer-executable instructions, that when executed by the one or more processors, control the computer system to apply the accessed application configuration to the application to execute the application on a virtual machine.

18. The computer system of claim 12, wherein computer-executable instructions, that when executed by the one or more processors, control the computer system to detect a change in hardware resources available to the executing application comprise computer-executable instructions, that when executed by the one or more processors, control the computer system to detect a change in the availability of a network service, the application configured to integrate with the network service when the network service is available.

19. The computer system of claim 12, wherein computer-executable instructions, that when executed by the one or more processors, control the computer system to disposition the detected change in available hardware resources comprise computer-executable instructions, that when executed by the one or more processors, control the computer system to store the detected change in available hardware resources to a computer storage device.

20. A method comprising:
executing an application at a device, the application configured to integrate with a plurality of resources, including integrating with a specified resource when the specified resource is available to the application, the application having a first state defined by a current availability of the specified resource, the application exhibiting first behavior based on the first state;

detecting a change to the availability of the specified resource, the change to the availability of the specified resource defining a second state for the application;
determining a second different behavior for the application based on the second state; and
executing the application to exhibit the second different behavior in response to the detected change in availability of the specified resource.

21. The method of claim 20, wherein executing the application at a device, the application exhibiting first behavior based on the first state comprises the application presenting a selectable user interface component for the specified resource at a display device based on the first state indicating that the specified resource is available to the application; and
wherein detecting a change in the availability of the specified resource defining a second state comprises, subsequent to presenting the user interface component, detecting that the specified resource is not available to the application.

22. The method of claim 21, wherein determining a second different behavior for the application based on the second state comprises:
determining that the selectable user interface component is to be removed from the display device based on the second state indicating that the specified resource is not available to the application;
determining that a further selectable user interface component is to be presented at the display device to replace the selectable user interface component, the further selectable user interface component for another resource from among the plurality of resources, the other resource providing at least a portion of the functionality of the specified resource.

23. The method of claim 20, wherein executing the application at a device the application exhibiting first behavior based on the first state comprises the application presenting a selectable user interface component for another resource at a display device based on the first state indicating that the specified resource is not available to the application, the other resource providing at least a portion of the functionality of the specified service; and
wherein detecting a change in the availability of the specified resource defining a second state comprises, subsequent to presenting the user interface component, detecting that the specified resource is available to the application.

24. The method of claim 23, wherein determining a second different behavior for the application based on the second state comprises:
determining that the selectable user interface component is to be removed from the display device based on the second state indicating that the specified resource is available to the application; and
determining that a further selectable user interface component at the display device to replace the selectable user interface component, the further selectable user interface component for the specified service.

25. The method of claim 20, wherein executing an application at a device comprises executing the device at a virtual machine and wherein the network resource is a virtual resource.

26. The method of claim 20, wherein the executing an application to exhibit a first behavior based on the availability of a specified resource comprises executing an application to exhibit a first behavior based on the availability of a network service.

27. A computer program product for use at a computer system, the computer program product for implementing a method, the computer program product comprising computer memory having stored thereon computer-executable instructions that, when executed at a processor, cause the computer system to perform the method, including the following:
- execute an application at a device, the application configured to integrate with a plurality of resources, including integrating with a specified resource when the specified resource is available to the application, the application having a first state defined by a current availability of the specified resource, the application exhibiting first behavior based on the first state;
- detect a change to the availability of the specified resource, the change to the availability of the specified resource defining a second state for the application;
- determine a second different behavior for the application based on the second state; and
- execute the application to exhibit the second different behavior in response to the detected change in availability of the specified resource.

28. The computer program product of claim 27, wherein computer-executable instructions that, when executed, cause the computer system to execute the application at a device, the application exhibiting first behavior based on the first state comprise computer-executable instructions that, when executed, cause the computer system to present a selectable user interface component for the specified resource at a display device based on the first state indicating that the specified resource is available to the application;
- wherein computer-executable instructions that, when executed, cause the computer system to detect a change in the availability of the specified resource defining a second state comprise computer-executable instructions that, when executed, cause the computer system to, subsequent to presenting the user interface component, detect that the specified resource is not available to the application;
- wherein computer-executable instructions that, when executed, cause the computer system to determine a second different behavior for the application based on the second state comprise computer-executable instructions that, when executed, cause the computer system, based on the second state indicating that the network resource is not available to the application, to:
  - determine that the selectable user interface component is to be removed from the display device; and
  - determine that a further selectable user interface component is to be presented at the display device to replace the selectable user interface component, the further selectable user interface component for another resource from among the plurality of resources, the other resource providing at least a portion of the functionality of the specified service; and
- wherein computer-executable instructions that, when executed, cause the computer system to execute the application to exhibit the second different behavior comprise computer-executable instructions that, when executed, cause the computer system to present the further selectable user interface component at the display device.

29. The computer program product of claim 27, wherein computer-executable instructions that, when executed, cause the computer system to execute the application at a device, the application exhibiting first behavior based on the first state comprise computer-executable instructions that, when executed, cause the computer system to present a selectable user interface component for a local resource of the device at a display device based on the first state indicating that the specified resource is not available to the application, the local resource providing at least a portion of the functionality of the specified resource;
- wherein computer-executable instructions that, when executed, cause the computer system to detect a change in the availability of the specified resource defining a second state comprise computer-executable instructions that, when executed, cause the computer system to subsequent to presenting the user interface component, detect that the specified resource is available to the application;
- wherein computer-executable instructions that, when executed, cause the computer system to determine a second different behavior for the application based on the second state comprise computer-executable instructions that, when executed, cause the computer system, based on the second state indicating that the specified resource is available to the application, to:
  - determine that the selectable user interface component is to be removed from the display device based on the second state indicating that the specified resource is available to the application; and
  - determine that a further selectable user interface component is to be presented at the display device to replace the selectable user interface component, the further selectable user interface component for the specified service; and
- wherein computer-executable instructions that, when executed, cause the computer system to execute the application to exhibit the second different behavior comprise computer-executable instructions that, when executed, cause the computer system to present the further selectable user interface component at the display device.

30. A method comprising:
- accessing an application configuration based on a defined first state for an application, the application configuration accessed from among a plurality of configurations stored in a computer hardware memory device;
- applying the accessed application configuration to an application to execute the application with a specified behavior based on the defined first state;
- detecting a change in hardware resources available to the executing application at the device subsequent to applying the configuration, the change defining a second state for the application based on the change to the available hardware resources;
- determining a context for the second state; and
- dispositioning the detected change in available hardware resources based on the context as defined in a policy for the context.

31. The method claim 30, wherein accessing an application configuration based on a defined first state for an application comprises accessing an application configuration to execute the application for solo operation.

32. The method of claim 30, wherein accessing an application configuration based on a defined first state for an application comprises accessing an application configuration to execute the application in a symbiotic relationship with another software component.

33. The method of claim 30, wherein applying the accessed configuration to the application to execute the application with a specified behavior comprises applying the accessed application configuration to cause the application to exhibit specified user interface behavior on a display device.

34. A computer program product for use at a computer system, the computer program product for implementing a method, the computer program product comprising computer memory having stored thereon computer-executable instructions that, when executed at a processor, cause the computer system to perform the method, including the following:
- access an application configuration based on a defined first state for an application, the application configuration accessed from among a plurality of configurations stored in a computer hardware memory device;
- apply the accessed application configuration to an application to execute the application with a specified behavior based on the defined first state;
- detect a change in hardware resources available to the executing application at the device subsequent to applying the configuration, the change defining a second state for the application based on the change to the available hardware resources;
- determine a context for the second state; and
- disposition the detected change in available hardware resources based on the context as defined in a policy for the context.

35. The computer program product of claim 34, wherein computer-executable instructions that, when executed, cause the computer system to detect a change in hardware resources available to the executing application comprise computer-executable instructions that, when executed, cause the computer system to detect a change in the availability of a network service, the application configured to integrate with the network service when the network service is available.

36. The computer program product of claim 34, wherein computer-executable instructions that, when executed, cause the computer system to disposition the detected change in available hardware resources comprise computer-executable instructions that, when executed, cause the computer system to store the detected change in available hardware resources to a computer storage device.

* * * * *